(12) United States Patent
Toyoda

(10) Patent No.: US 10,063,768 B2
(45) Date of Patent: Aug. 28, 2018

(54) IMAGING DEVICE CAPABLE OF COMBINING A PLURALITY OF IMAGE DATA, AND CONTROL METHOD FOR IMAGING DEVICE

(71) Applicant: Olympus Corporation, Hachioji-shi, Tokyo (JP)

(72) Inventor: Tetsuya Toyoda, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/717,688

(22) Filed: Sep. 27, 2017

(65) Prior Publication Data
US 2018/0020154 A1 Jan. 18, 2018

Related U.S. Application Data

(63) Continuation of application No. 14/720,506, filed on May 22, 2015, now Pat. No. 9,807,293.

(30) Foreign Application Priority Data

Jun. 3, 2014 (JP) .................... 2014-114813

(51) Int. Cl.
| | | |
|---|---|---|
| *H04N 5/232* | (2006.01) | |
| *G03B 41/00* | (2006.01) | |
| *G03B 3/10* | (2006.01) | |
| *H04N 5/262* | (2006.01) | |
| *H04N 5/235* | (2006.01) | |
| *G03B 13/36* | (2006.01) | |

(52) U.S. Cl.
CPC .......... *H04N 5/23212* (2013.01); *G03B 3/10* (2013.01); *G03B 41/00* (2013.01); *H04N 5/2356* (2013.01); *H04N 5/23258* (2013.01); *H04N 5/23261* (2013.01); *H04N 5/23267* (2013.01); *H04N 5/23293* (2013.01); *H04N 5/2621* (2013.01); *G03B 13/36* (2013.01)

(58) Field of Classification Search
CPC ............. H04N 5/2356; H04N 5/23212; H04N 5/23293; H04N 5/23219; G03B 13/36; G02B 7/102
See application file for complete search history.

(56) References Cited

U.S. PATENT DOCUMENTS

2013/0016885 A1* 1/2013 Tsujimoto ............... G06T 5/003
382/128

* cited by examiner

*Primary Examiner* — Sinh Tran
*Assistant Examiner* — Selam Gebriel
(74) *Attorney, Agent, or Firm* — John C. Pokotylo; Pokotylo Patent Services

(57) ABSTRACT

An imaging device comprises an image data acquisition circuit that determines a plurality of focus positions by repeatedly shifting focus position by a given amount, forms subject images at respective focus positions, and acquires, from the subject images that have been formed, a plurality of image data of a first resolution, or a plurality of image data of a second resolution that is different to the first resolution, and an image combination circuit that generates first image data by combining the plurality of image data of the first resolution, or generates second image data by combining the plurality of image data of the second resolution.

9 Claims, 10 Drawing Sheets

IMAGING DEVICE CAPABLE OF COMBINING A PLURALITY OF IMAGE DATA, AND CONTROL METHOD FOR IMAGING DEVICE

RELATED APPLICATIONS

This application is a continuation application of U.S. patent application Ser. No. 14/720,506 (referred to as "the '506 application" and incorporated herein by reference), filed on May 22, 2015, titled "IMAGING DEVICE, AND CONTROL METHOD FOR IMAGING DEVICE" and listing Tetsuya TOYODA as the inventor, the '506 application claiming benefit of Japanese Application No. 2014-114813 filed in Japan on Jun. 3, 2014, the contents of which are incorporated by this reference.

BACKGROUND OF THE INVENTION

1. Field of the Invention

The present invention relates to an imaging device for acquiring a plurality of image data while changing focus position, and a control method for an imaging device.

2. Description of the Related Art

As technology for acquiring an image having a wide depth of field, technology is known for shooting a plurality of images while changing focus position of a photographing lens, extracting in-focus regions from respective images, and combining (also called focus stacking). This focus stacking technology generally requires a huge amount of image processing calculation, and so when it is desired to instantly confirm a depth of field magnification effect for depth of field before shooting or after shooting, it is necessary to obtain the same effect with a simple method.

Japanese patent laid-open number 2012-124555 (hereafter referred to as "patent publication 1") discloses determining whether or not a focused range has been entered from shooting conditions and processing attributes of image processing, and issuing a notification when the subject is outside of the focused range. In this way, it is possible for the photographer to carry out confirmation as to whether or not the depth of field after combination is as they would like.

SUMMARY OF THE INVENTION

In patent publication 1, a focused range is calculated in accordance with an optical model, and errors intricately including aberrations etc. arise which cannot be overlooked as mere focused range of an actual optical system. Also, since it is not possible to confirm a depth of field magnification effect in an image, it is difficult for the photographer to determine whether the image is as they intended.

An object of the present invention is to provide an imaging device, and a control method for an imaging device, that make it possible to accurately confirm a depth of field focus stacking effect in an image beforehand.

An imaging device of the present invention comprises an image data acquisition circuit for forming a subject image while shifting focus position by a given amount and acquiring a plurality of image data, an image selection circuit for selecting images to be combined based on shift amount of focus position when image data was acquired by the image data acquisition circuit, and image data resolution, and an image combination circuit for combining the plurality of image data that were selected by the image selection circuit, to generate image data having a large depth of field.

An imaging device of the present invention comprises an image data acquisition circuit for forming a subject image while shifting focus position by a given amount and acquiring a plurality of image data, an operation member for instructing actual shooting, an image combination circuit for, when the actual shooting has been instructed by the operation member, selecting some from among the plurality of image data that were acquired by the image data acquisition circuit, and combining the selected image data to generate image data for confirmation of a large depth of field, and a display circuit for displaying a focus stacking image based on image data for confirmation that was combined by the image combination circuit.

A control method for an imaging device of the present invention comprises forming a subject image while shifting focus position by a given amount and acquiring a plurality of image data, selecting image data to be combined based on shift amount of focus position when image data was acquired by the image acquisition circuit, and image data resolution, and combining the plurality of image data that was selected by the image selection circuit, to generate image data having a large depth of field.

DETAILED DESCRIPTION OF THE PREFERRED EMBODIMENTS

An example where a digital camera is adopted as a preferred embodiment of the present invention will be described in the following. This digital camera has an imaging circuit, with a subject image being converted to image data by this imaging circuit, and the subject image being subjected to live view display on a display circuit arranged on the camera body based on this converted image data. A photographer determines composition and photo opportunity by looking at the live view display. At the time of a shutter release operation image data is stored in a storage medium. Image data that has been stored in the storage medium can be played back and displayed by the display circuit if playback mode is selected.

Also, with this camera, in a case where focus stacking mode is set, if a shutter release button for instructing shooting preparation has been pressed down half way, a plurality of images are acquired for focus stacking by sequentially moving focus position of the photographing lens, focus stacking is carried out, and a resulting focus stacked image is displayed for image combination effect confirmation (refer to S36, S37 and S38 of FIG. 3, which will described later). Also, if a shutter release button for instructing actual shooting is pressed down fully, a plurality of images are acquired for focus stacking by sequentially moving focus position of the photographing lens, focus stacking is carried out, and a resulting focus stacked image is displayed for image effect confirmation (refer to S43, S44 and S45 of FIG. 3, which will described later). Also, focus stacking for storage is carried out using the plurality of images at this time, and the resulting image is stored in the storage medium (refer to S46 and S47 in FIG. 3, which will be described later). In the case of carrying out focus stacking for confirmation, compared to focus stacking that is carried out for storage, the number of frames of images to be used is fewer, and resolution of the image data is also lower.

Figure 1:
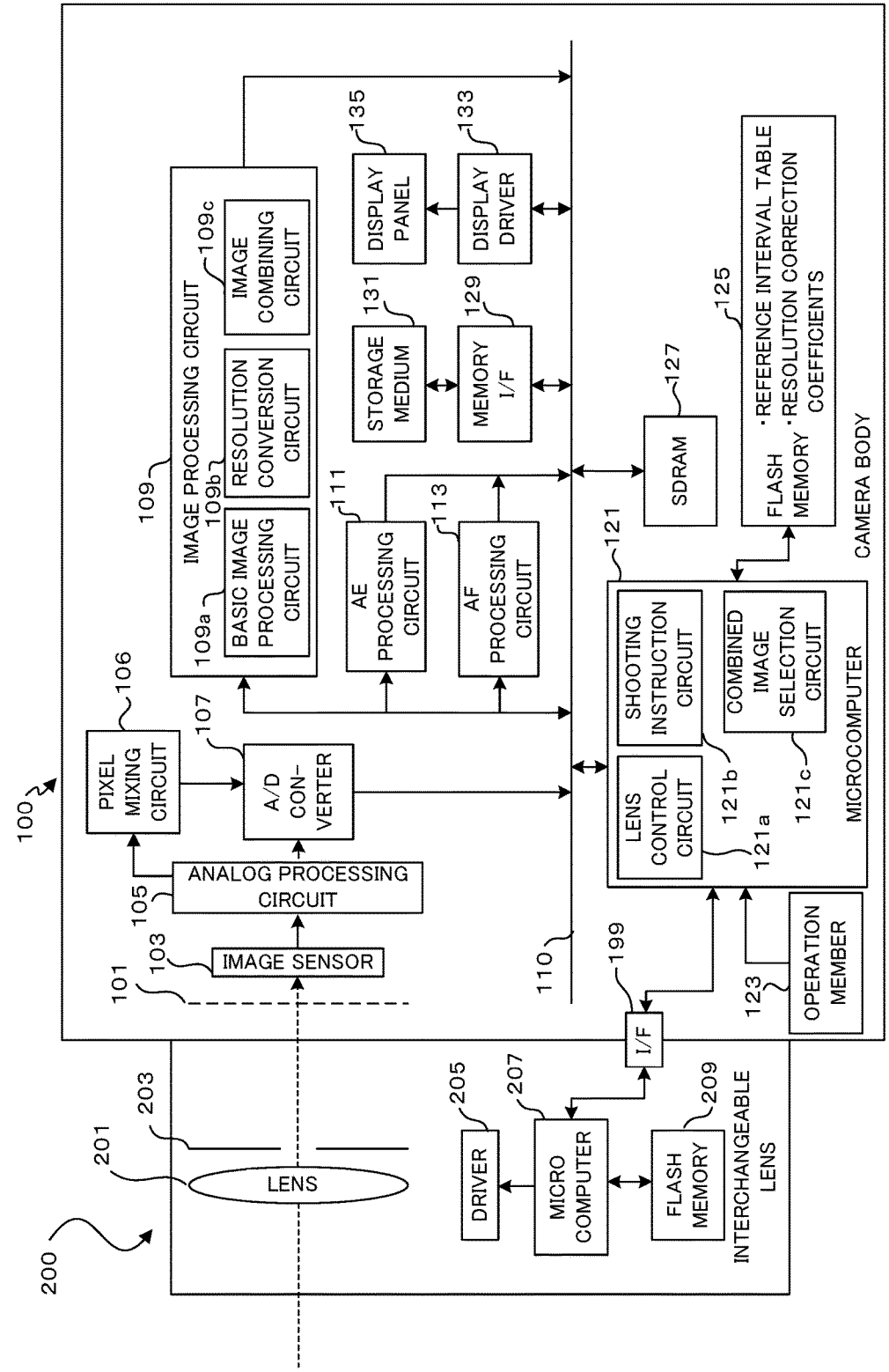
FIG. 1 is a block diagram mainly showing the electrical structure of a camera of one embodiment of the present invention.

FIG. 1 is a block diagram mainly showing the electrical structure of a camera of one embodiment of the present invention. This camera comprises a camera body 100 and an interchangeable lens 200 that can be attached to and removed from the camera body. With this embodiment, the photographing lens is an interchangeable lens, but this is not limiting, and it is also possible to have a digital camera of a type where a photographing lens is fixed to the camera body.

The interchangeable lens 200 is made up of a photographing lens 201, a diaphragm 203, a driver 205, a microcomputer 207 and a flash memory 209, and has an interface (hereafter referred to as I/F) 199 between the interchangeable lens 200 and the camera body 100, which will be described later.

The photographing lens 201 is constituted by a plurality of optical lenses (including a focus lens for focus adjustment) for forming a subject image, and is a fixed focal length lens or a zoom lens. The diaphragm 203 is arranged to the rear on the optical axis of this photographing lens 201, and the diaphragm 203 has a variable aperture to control amount of subject light flux passing through the photographing lens 201. Also, the photographing lens 201 can be moved in the optical axis direction by the driver 205, with focus position being controlled by moving a focus lens within the photographing lens 201 based on control signals from the microcomputer 207, and in the case where the photographing lens 201 is a zoom lens focal length is also controlled. The driver 205 also controls aperture of the diaphragm 203.

The microcomputer 207 that is connected to the driver 205 is connected to the I/F 199 and the flash memory 209. The microcomputer 207 operates in accordance with program code stored in the flash memory 209, to perform communication with a microcomputer 121 within the camera body 100, which will be described later, and performs control of the interchangeable lens 200 based on control signals from the microcomputer 121.

The microcomputer 207 acquires focus position of the focus lens from a focus position detection circuit (not shown), and acquires zoom position of the zoom lens from a zoom position detection section (not shown). The acquired focus position and zoom position are transmitted to the microcomputer 121 within the camera body 100.

Besides the previously described program code, various information such as optical characteristics of the interchangeable lens 200 and adjustment values are stored in the flash memory 209. The microcomputer 207 transmits these various items of information to the microcomputer 121 within the camera body 100. The I/F 199 is an interface for carrying out communication between the microcomputer 207 inside the interchangeable lens 200 and the microcomputer 121 inside the camera body 100.

Inside the camera body 100, a mechanical shutter 101 is arranged on the optical axis of the photographing lens 201. This mechanical shutter 101 controls the time for which subject light flux passes, and a well-known focal plane shutter or the like is adopted. Behind this mechanical shutter 101, an image sensor 103 is arranged at a position where the subject image is formed by the photographing lens 201.

The image sensor 103 functions as an imaging circuit for forming a subject image and acquiring image data, and has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode. A Bayer array RGB filter is arranged on the front surface of each pixel. The image sensor 103 also has an electronic shutter. This electronic shutter carries out control of exposure time by controlling the time from charge storage until charge readout of the image sensor 103. The image sensor 103 is not limited to a Bayer array, and a layered type such as Foveon (Registered trademark), for example, can also be used.

The image sensor 103 is connected to an analog processing circuit 105, and this analog processing circuit 105 performs wave shaping on the photoelectric conversion signals (analog image signals) that have been read out from the image sensor 103 after reducing reset noise etc., and also carries out gain increase so as to achieve an appropriate brightness.

The analog processing circuit 105 is connected to a pixel mixing circuit 106 and the A/D converter 107. For image signals that have been output for every pixel of the image sensor 103 and subjected to analog processing, the pixel mixing circuit 106 mixes a plurality of pixel image signals. For example, image signals from 2 pixels, 4 pixels or 9 pixels are added, and output as a single image signal. Display precision of the display panel 135 for displaying a live view image is not so high, and since this is sufficient display precision even if it is lower than the precision required by an image for storage, pixel mixing is carried out by the pixel mixing circuit 106 for live view display etc.

The A/D converter 107 is connected to the analog processing circuit 105 and the pixel mixing circuit 106, and performs analog to digital conversion on the analog image signals output from the analog processing circuit 105 or the pixel mixing circuit 106, and outputs digital image signals (hereafter referred to as image data) to the bus 110.

The bus 110 is a transfer path for transferring various data, that has been read out or generated inside the camera body 100, within the camera body 100. Besides the previously described A/D converter 107, an image processing circuit 109, AE (Auto Exposure) processing circuit 111, AF (Auto Focus) processing circuit 113, microcomputer 121, SDRAM 127, memory interface (hereafter referred to as memory I/F) 129, and display driver 133 are connected to the bus 110.

The image processing circuit 109 has a basic image processing circuit 109a for carrying out ordinary image processing, a resolution conversion circuit 109b, and an image combination circuit 109c for carrying out image combination. When combining a plurality of images, the basic image processing circuit 109a, the resolution conversion circuit 109b, and the image combination circuit 109b are used.

The basic image processing circuit 109a performs optical black (OB) subtraction processing, white balance (WB) correction, demosaicing processing in the case of Bayer data, color reproduction processing, gamma correction processing, color matrix computation, noise reduction (NR) processing, edge enhancement processing etc. on RAW data. In a single exposure, and if a special effect such as focus stacking has not been set, image processing is completed with only processing by this basic image processing circuit 109a.

The resolution conversion circuit 109b converts resolution of image data. With this conversion of resolution, pixel interpolation such as bicubic interpolation is used, resolution of the image is lowered, and it is possible to resize the image. The resolution conversion circuit 109b functions as a resolution conversion circuit for changing the resolution of image data that has been acquired by the image acquisition circuit (image sensor 103, driver 205, lens control circuit 121a, etc.).

The image combination circuit 109c carries out various image combination in accordance with a combination mode that is set etc. With this embodiment, as will be described later, a combination mode, such as focus stacking for increasing depth of field, can be set. In the event that focus stacking mode is set, the image combination circuit 109c carries out alignment of a plurality of image data that have been taken at a plurality of focus positions, extracts regions of high sharpness (contrast) of the images, and generates an image having a different depth of field to a single image by combining the high sharpness regions. The image combination circuit 109c functions as an image combination circuit for generating image data having a large depth of field by combining a plurality of image data that were selected by an image selection circuit that will be described later (described in detail for a combined image selection circuit 121c).

The image combination circuit 109c also functions as an image combination circuit for generating image data having a large depth of field by combining some or all of the plurality of image data that were acquired by the image data acquisition circuit, when a shooting preparation state has been instructed using the operation member (refer to S36 and S37 in FIG. 3, which will be described later). The image combination circuit 109c also functions as an image combination circuit for, when the actual shooting has been instructed using the operation member, selecting some from among the plurality of image data that were acquired by the image data acquisition circuit, and combining the selected image data to generate image data for confirmation (refer to S44 and S45 in FIG. 3). The image combination circuit 109c also functions as an image combination circuit for generating image data for combination by combining all of the plurality of image data that were acquired by the image data acquisition circuit (refer to S46 in FIG. 3).

Although not illustrated, an image compression circuit and an image expansion circuit are provided within the image processing circuit 109. At the time of storage of image data to the storage medium 131, the image compression circuit subjects image data that has been read out from the SDRAM 127 to compression in accordance with various compression formats such as JPEG compression in the case of a still picture or MPEG in the case of a movie. Also, the image expansion circuit carries out expansion of JPEG image data and MPEG image data for image playback display. In the expansion, a file that is stored in the storage medium 131 is read out, and after being subjected to expansion processing in the image expansion circuit the expanded image data is temporarily stored in the SDRAM 127. With this embodiment, the JPEG compression system and MPEG compression system are adopted as the image compression system, but the compression system is not limited to this and another compression systems may be used, such as TIFF, H.264 etc. Also, the compression system may be lossless compression or lossy transmission.

The AE processing circuit 111 measures subject brightness based on image data that has been input via the bus 110, and outputs this subject brightness information to the microcomputer 121 via the bus 110. A dedicated photometric sensor for subject brightness measurement may be provided, but in this embodiment subject brightness is calculated based on image data.

The AF processing circuit 113 extracts signals for high frequency components from image data, acquires a focus evaluation value using integration processing, and outputs the focus evaluation value via the bus 110 to the microcomputer 121. In this embodiment, focusing of the photographing lens 201 is carried out using the so-called contrast method. With this embodiment AF control using a contrast method is given as an example, but it is also possible to carry out focusing by AF control using phase difference AF, where subject light flux is divided and phase difference sensors are provided on the optical paths, or a phase difference sensor is provided on an image sensor. The AF processing circuit 113 etc. function as an AF circuit for detecting a contrast peak, based on image data that has been acquired by the image data acquisition circuit, and moving the photographing lens to an in-focus position, when the shooting preparation state has been instructed using the operation member.

The microcomputer 121 has a CPU (central Processing Unit) and peripheral circuits for this CPU, and provides a function as a control circuit for this entire camera, and performs overall control of various sequences of the camera in accordance with program code stored in the flash memory 125. Besides the previously described I/F 199 an operation member 123 and a flash memory 125 are connected to the microcomputer 121. The microcomputer 121 also has a lens control circuit 121a, shooting instruction circuit 121b and combined image selection circuit 121c, and these circuits may be implemented as hardware, or the functions of the circuits executed using software.

The lens control circuit 121a changes focus position by moving the photographing lens by means of the microcomputer 207 and driver 205 inside the interchangeable lens 200. As will be described later, when shooting, at the time of focus stacking AF (S36 in FIG. 3) or at the time focus stacking mode is set (S43 in FIG. 3, S83 in FIG. 5), the lens control circuit 121a receives instructions from the shooting instruction circuit 121b and changes focus position.

The shooting instruction circuit 121b instructs focus position to the lens control circuit 121a in accordance with instruction for focus position from the combined image selection circuit 121c, and instructs imaging a plurality of times to the image sensor 103. Specifically, when focus stacking mode is set the photographing lens 201 is sequentially moved to a plurality of focus positions, the image sensor 103 carries out imaging at the respective positions, and a plurality of image data are acquired. The shooting instruction circuit 121*b* carries our control of these shooting operations. This shooting instruction circuit 121*b* etc. function as an image data acquisition circuit for forming a subject image while shifting focus position by a given amount and acquiring a plurality of image data. Also, the image data acquisition circuit acquires image data by shifting focus position by a shift amount appropriate for detection of contrast peak from the image data (refer to FIG. 4).

The combined image selection circuit 121*c* is input with a reference interval table and resolution correction coefficient of the flash memory 125, and carries out selection of combined images. Specifically, when focus stacking mode is set, images to be focus stacked are selected by reading out and utilizing the data of focus position interval of images to be taken for focus stacking, and a resolution correction coefficient (also called combination interval correction coefficient) for carrying out thinning of image data etc. in order to reduce resolution for combination from image data is also read out.

This combined image selection circuit 121*c* functions as an image selection circuit for selecting images to be combined based on shift amount of focus position when image data was acquired by the image data acquisition circuit, and image data resolution. This image selection circuit also selects images to be combined based on at least shift amount all focus position and resolution after resolution change. The image selection circuit also increases shift amount of focus position of images to be combined as resolution after resolution change by the resolution conversion circuit is lowered, and as resolution of images that have been acquired by the image data acquisition circuit is lowered. Also, regarding the number of combination frames selected by the image selection circuit, the most numerous are combination frames of images for storage, followed by combination frames of confirmation images for storage for actual shooting, and finally the least numerous are combination frames for images for combination effect confirmation for the shooting preparation state (refer to FIG. 7.

The operation member 123 includes operation members such as various input buttons, like a power supply button, shutter release button, a movie button, playback button, menu button, cross-shaped key, and OK button, and various input keys, and detects operating states of these operation members and outputs the result of detection to the microcomputer 121. The microcomputer 121 executes various sequences according to user operation based on the result of detection of the operation members from the operation member 123. The power supply button is an operation member for instructing to turn a power supply of the digital camera on or off. If the power supply button is pressed, the power supply of the digital camera is turned on, and if the power supply button is pressed once again the power supply of the digital camera is turned off.

The shutter release button is made up of a first shutter release switch that turns on when the button is pressed down half way, and a second shutter release switch that is turned on when the button is pressed down further from the half-pressed state to be pressed down fully. The microcomputer 121 executes shooting preparation sequences such as an AE operation and AF operation if the first shutter release switch is turned on. Also, if the second shutter release switch is turned on shooting is carried out by executing a series of shooting sequences to control the mechanical shutter 101 etc., acquire image data based on a subject image from the image sensor 103 etc., and store this image data in the storage medium 131. The shutter release button functions as an operation member for instructing the shooting preparation state (refer to S33 in FIG. 3). The release button also functions as an operation member for instructing actual shooting (refer to S41 in FIG. 3).

The movie button is an operation button for instructing start or finish of movie shooting, and if the movie button is initially operated movie shooting commences, and movie shooting finishes when it is operated again. The playback button is an operation button for setting and canceling playback mode settings, and if playback mode is set image data of a taken image is read out from the storage medium 131, and a taken image is playback displayed on the display panel 135.

The menu button is an operation button for causing display of menu screens on the display panel 135. It is possible to carry out the various camera settings on the menu screens. As camera setting there is, for example, combination mode, such as focus stacking, and as combination mode, besides focus stacking there are modes such as HDR combination and super-resolution combination.

The flash memory 125 is an electrically rewritable non-volatile memory, and stores program code for executing the various sequences of the microcomputer 121. The microcomputer 121 carries out overall control of the camera based on this program code. The flash memory 125 stores a reference interval table and a resolution correction coefficient.

The SDRAM 127 is an electrically rewritable volatile memory for temporary storage of image data etc. This SDRAM 127 temporarily stores image data that has been output from the A/D converter 107, and image data that has been processed in the image processing circuit 109 etc.

The memory I/F 129 is connected to the storage medium 131, and carries out control for reading and writing of data, such as image data and headers attached to image data, to and from the storage medium 131. The storage medium 131 is a storage medium such as a memory card that can be loaded into and taken out of the camera body 100, but this is not limiting and it may also be a hard disk or the like built into the camera body 100. The storage medium 131 functions as a storage circuit for storing image data, and this storage circuit stores image data for storage that has been generated by the image combination circuit (refer to S47 in FIG. 3).

The display driver 133 is connected to the display panel 135, and reads out from the SDRAM 127 and storage medium 131 to display an image on the display panel 135 based on image data that has been expanded by the image expansion circuit within the image processing circuit 109. The display panel 135 is arranged on a rear surface of the camera body 100, and carries out image display. The display panel 135 is arranged on a display surface of an external section of the camera, such as the rear surface, which makes it a display panel that is prone to the effects of external light, but it is possible to install a large-sized display panel. As a display panel it is possible to adopt various display panels such as a liquid crystal display panel (LCD, TFT), or organic EL etc. The display circuit has a display driver 133 and a display panel 135.

As image display modes of the display panel 135, there are Quickview Display for displaying image data to be stored for only a short time immediately after being taken, playback display of image files for still images and movies that have been stored in the storage medium 131, and movie display such as live view display. The display driver 133 and the display panel 135 function as a display circuit for displaying a focus stacking image based on image data for confirmation that has been combined by the image combination circuit (refer to S38 and S45 in FIG. 3).

Next, main processing of the camera of this embodiment will be described using the flowcharts shown in FIG. 2 and FIG. 3. The flowcharts shown in FIG. 2 and FIG. 3, and in FIG. 4-FIG. 6, which will be described later, are executed by the microcomputer 121 controlling each section in accordance with program code stored in the flash memory 125.

Figure 2:
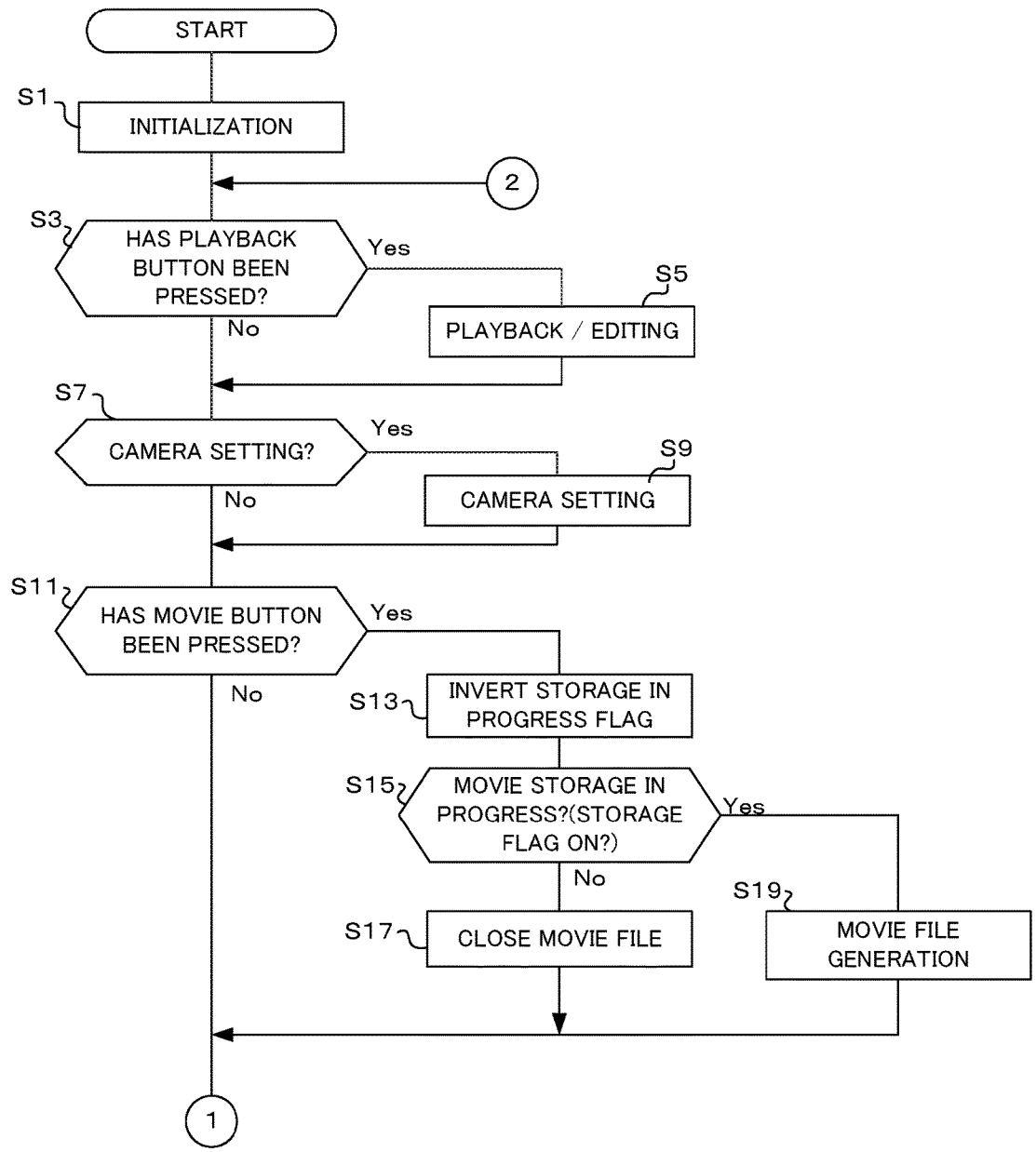
FIG. 2 is a flowchart showing main operation of the camera of one embodiment of the present invention.

If the power supply button within the operation member 123 is operated and the power supply is turned on, the microcomputer 121 commences processing based on the main flow shown in FIG. 2. Once operation has commenced, initialization is first executed (S). As part of the initialization, mechanical initialization and electrical initialization, such as initialization of various flags etc., are carried out. As one of the various flags, a storage in progress flag indicating whether or not movie storage is in progress is reset to off (refer to Steps S13, S15 and S31). An on state for respective flags is shown as "1" and off is shown as "0".

Once initialization has been carried out, it is next determined whether or not the playback button has been pressed (S3). Here, determination is carried out by detecting the operating state of the playback button within the operation member 123. If the result of this determination is that the playback button has been pressed, playback/editing mode is executed (S5). Here, image data is read out from the storage medium 131, and a table of still images and movies is displayed on the LCD 135. The user selects an image from within the table by operating the cross-shaped key and decides on the image using the OK button. It is also possible to carry out editing of a selected image.

If playback/editing is executed in step S5, or if the result of determination in step S3 was that the playback button had not been pressed, it is determined whether or not camera setting will be carried out (S7). When the menu button within the operation member 123 has been operated, camera setting is carried out on a menu screen. In this step therefore, determination is based on whether or not this camera setting has been carried out.

If the result of determination in step S7 is camera setting, camera setting is carried out (S9). As described previously, it is possible to carry out various camera settings on the menu screens. As camera settings it is possible to set, for example, modes such as normal shooting and focus stacking as shooting modes. It is also possible to set normal mode and macro mode as AF mode. Here, macro mode is a shooting mode suitable for shooting a subject that is very close.

If camera setting has been carried out in step S9, or if the result of determination in step S7 was not camera setting, it is next determined whether or not the movie button has been pressed (S11). Here the microcomputer 121 carries out determination based on operating state of the movie button input from the operation member 123.

If the result of determination in step S11 is that the movie button has been pressed, inversion of the storage in progress flag is next carried out (S13). The storage in progress flag is set to on (1) if movie storage is progress, or set to off (0) if a movie is not being shot. In this step the flag is inverted, that is, if it is set to on (1) it is inverted to off (0), and if it is set to off (0) it is inverted to on (1).

Once inversion of the storage in progress flag has been carried out in step S13, it is next determined whether or not storage of a movie is in progress (S15). Here, determination is based on whether the storage in progress flag, which was inverted in step S13, is set to on or set to off.

If the result of determination in step S15 is that movie storage is in progress, a movie file is created (S19). Movie storage is carried out in step S61, which will be described later, but in this step a movie file for movie storage is created, and preparation so as to be able to store image data of the movie is performed.

On the other hand, if the result of determination is that movie storage is not in progress, the movie file is closed (S17). The movie file is closed in this step because the movie button has been pressed and movie shooting is completed. When closing the movie file, the movie file is placed in a state where it can be played back as a movie file by storing a number of frames in a header of the movie file etc., and file writing is completed.

Once the movie file has been closed in step S17, or if a movie file is created in step S19, or if the result of determination in step S11 was that the movie button was not pressed, it is next determined whether or not movie storage is in progress (S31). In this step, similarly to step S15, determination is based on whether the storage in progress flag is on or off.

If the result of determination in step S31 is that movie storage is not in progress, it is next determined whether or not the shutter release button has been pressed halfway, in other words, whether or not the first shutter release switch has changed from off to on (S33). A state of the first shutter release switch that is linked to the shutter release button is detected by the operation member 123, and this determination is carried out based on the result of this detection. If the result of detection is that the first shutter release switch has changed from off to on, the result of determination becomes Yes, while on the other hand if an on state or an off state is maintained the result of determination becomes No.

If the result of determination in S33 is that the shutter release button has been pressed down half way, and the first shutter release switch has changed from off to on, namely when the first shutter release switch has transitioned to on, an AE operation is executed (S35). Here, the AE processing circuit 111 detects subject brightness based on image data acquired by the image sensor 103, and calculates shutter speed and aperture value etc. for correct exposure based on this subject brightness.

Once the a operation has been carried out, next, in steps S36-S38, focus stacking AF is carried out, and a combination effect image is generated and displayed. First, focus stacking AF is carried out (S36). Here, the position of a contrast signal is detected while focus position of the photographing lens 201 is moved by the driver 205 by means of the microcomputer 207 within the interchangeable lens 200 in order to carry out the AF operation.

Also, in step S36, the shooting instruction circuit 121b acquires a plurality of images in order to generate an image for confirmation of focus stacking. With a normal AF operation, only detection of peak position of a contrast signal needs to be carried out, and so scanning may be performed in front of and behind the peak position, but with this embodiment, in order to acquire images for carrying out focus stacking, focus position is moved in a wider range than in front of and behind the peak position.

Also, in step S36, in focus stacking AF, focus position is set in order to carry out focus stacking when the shutter release button has been pressed down fully. Detailed operation of this image focus stacking AF will be described later using FIG. 4. Selection of images will also be described later using FIG. 7.

If focus stacking AF has been carried out in step S36, next image processing for combination effect confirmation is carried out (S37). Here, focus stacking for combination effect confirmation is carried out using the plurality of images that were acquired in step S36. This focus stacking is performed in order to carry out confirmation etc. of the effect of focus stacking, for example, an in-focus range on the display panel 135, and so, taking into consideration display precision of the display panel 135, the number of image frames used is fewer than for focus stacking carried out for storage, and image resolution is also made lower. Detailed operation of this image processing will be described later using FIG. 6.

If image processing has been carried out in step S37, next display for combination effect confirmation is carried out (S38). Here, an image that was subjected to focus stacking in step S37 is displayed on the display panel 135 for a given time, for example, three seconds. The photographer can monitor the focus stacking image for confirmation and can confirm an in-focus range.

If the result of determination in step S33 is that the shutter release button did not transition from off to on, specifically, that there has been no change to the state of the first shutter release switch, it is next determined whether or not the shutter release button has been pressed down fully to turn the second shutter release switch on (S41). In this step, a state of the second shutter release switch that is linked to the shutter release button is detected by the operation member 123, and determination is carried out based on the result of this detection.

If the result of determination in step S41 is that the shutter release button is pressed down fully and that the second shutter release switch has been turned on, shooting is carried out (S43). Here, the diaphragm 203 is controlled with the aperture value that was calculated in step S35, and the shutter speed of the mechanical shutter 101 is controlled with the calculated shutter speed. Then, once the exposure time corresponding to the shutter speed has elapsed, image signals are read from the image sensor 103, and RAW data that has been processed by the analog processing circuit 105 and the A/D converter 107 is output to the bus 110.

Also, in the case where focus stacking mode is set, according to shooting condition such as aperture, focal length and subject distance (whether it is macro or long-distance), focus lens is moved to a plurality of focus positions that were set for focus stacking in step S77, and shooting is carried out each time one of the set focus positions is reached to acquire a plurality of image data. Detailed operation of this shooting operation will be described later using FIG. 5. The plurality of focus positions are made positions of images to be stored and when images for confirmation are combined, then the combined image selection circuit 121c selects from a plurality of images, as was described in step S44.

If shooting is carried out in step S43, image processing for stored image confirmation is carried out (S44). Here, the combined image selection circuit 121c selects image data to be used as an image for confirmation from among the plurality of image data that were acquired in step S43, and carries out focus stacking using the selected image data. Compared to the stored image of S46, which will be described later, either the number of frames of the image data to be used is fewer, or resolution of the image data is lower, which means that it is possible to carry out the focus stacking processing in a comparatively short time. Detailed operation of this image processing will be described later using FIG. 6.

Since the image processing of step S44 is for confirmation of a stored image, compared to the image processing for combination effect confirmation of step S37, in order to confirm with an image of higher precision, it is preferable for at least one of the number of frames or the resolution of the image data that will be used to be high.

If image processing for confirmation of a stored image has been carried out step S44, next image display for stored image confirmation is carried out (S45). Here, image data of a focus stacking image that was generated in step S44 is displayed on the display panel 135 for a given time. The photographer monitors the confirmation image, which is substantially the same as the focus stacking image to be stored immediately after shooting, and can confirm an in-focus range from this. If the confirmation image is not as the photographer intended, the focus stacking may be deleted by operating the operation member.

If display of the confirmation has been carried out in step S45, next image processing for storage is carried out (S46). Here, image processing for storage is carried out by the image processing circuit 109 using the plurality of image data was acquired in step S43. Also, in the case where focus stacking mode has been set, focus stacking is carried out using the plurality of image data that was acquired in step S43. Detailed operation of this image processing will be described later using FIG. 6.

If displaying of the confirmation image has been carried out in S45, the microcomputer 121 may execute processing of step S31 after, in parallel with processing of steps S46 and S47. This is because during execution of steps S46 and S47 also there may be situations where the photographer wishes to carry out preparation for the next shooting rapidly. Here, display is not carried out for the focus stacking image that has been subjected to storage processing, but display of focus stacking image can follow after display of the confirmation image.

Once image processing has been carried out, still picture storage is next carried out (S47). Here, image data for a still picture to which image processing has been applied is stored in the storage medium 131. At the time of still picture storage, storage is carried out using a format that has been set (storage format can be set in the camera setting of step S9). In the event that JPEG has been set, the data that has been subjected to image processing is subjected to JPEG compression in the image compression circuit, and stored. In the case of TIFF format, image data is converted to RGB data and stored in RGB format. Also, in the event that RAW storage is set, if combination is carried out with RAW data that has been acquired by shooting, combined RAW data is also stored. A storage destination for image data may be the storage medium 131 within the camera body, or may be storage to an external device via a communication circuit (not shown).

If the result of determination in step S41 is not that the shutter release button has been pressed down fully (second shutter release switch turned on), or if the result of determination in step S31 was that movie storage is in progress, next an AE operation is carried out (S51). If the determination in previously described step S41 is No, it is a situation where no operation was carried out for the shutter release button, and in this case live view display of step S57, which will be described later, is carried out. Also, if the determination in previously described step S31 is Yes, movie storage is in progress. In this step, shutter speed and ISO sensitivity for the electronic shutter of the image sensor 103 in order to carry out live view display or movie shooting at the correct exposure are calculated.

Once AE has been carried out, shooting using the electronic shutter is carried out (S53). Here, the subject image is converted to image data. Specifically, charge storage is performed during an exposure time that is determined by the electronic shutter of the image sensor 103, and image data is acquired by reading out the stored charge once the exposure time has elapsed.

Once shooting using the electronic shutter has been carried out, image processing is carried out on the acquired image data (S55). In this step, basic image processing such as WB correction, color matrix calculation, gamma conversion, edge enhancement, noise reduction etc. is carried out by the basic image processing circuit 109a.

If basic image processing has been carried out, live view display is next carried out (S57). In this step, live view display is carried out on the display panel 135 using the image data that was subjected to basic image processing in step S55. Specifically, image data was acquired in step S53, and image processing was carried out, and so update of the live view display is carried out using an image that has been subjected to this processing. A photographer can determine composition and shutter speed by observing the live view display.

Once live view display has been carried out in step S57, it is next determined whether or not movie storage is in progress (S59). Here it is determined whether or not the storage in progress flag is on. If the result of this determination is that movie storage is in progress, movie storage is carried out (S61). Here, image data read out from the image sensor 103 is subjected to image processing to give image data for a movie, and stored in a movie file.

If movie storage has been carried out in step S61, if the result of determination in step S59 was that movie storage was not in progress, if still picture storage was carried out in step S47, or if display of an image for combination effect confirmation was carried out in step S38, it is next determined whether or not the power supply is off (S39). In this step it is determined whether or not the power supply button of the operation member 123 has been pressed again. If the result of this determination is not power off, processing returns to step S3. On the other hand, if the result of determination is power off, a termination operation of the main flow is executed and then this main flow is terminated.

In this way, in the main flow of the one embodiment of the present invention, it is possible to set a shooting mode for combining a plurality of image data, such as focus stacking mode (S9). In a case where focus stacking mode has been set, if the shutter release button is pressed down half way (S33 Yes) focus stacking AF is carried out, focus stacking is performed for combination effect confirmation, and a generated image is displayed (S35-S38). As a result, a focus stacking image is displayed as a result of a half press operation of the shutter release button, even while live view display is in progress, it is possible to monitor the focus stacking image before shooting, and it is possible to confirm an in-focus range etc.

Also, if the shutter release button is pressed down fully (S41 YES), actual shooting is carried out, that is, shooting is carried out while changing focus lens position, and a plurality of image data are acquired (S43). Some images are selected from among the plurality of image data, focus stacking is carried out for stored image confirmation, and the generated image is displayed (S44, S45). Since the number of frames for image data used for combination is less than for image data for storage, it is possible to complete processing and display the focus stacking image in a short time (S45). As a result, it is possible to confirm a focus stacking image that is substantially the same as a stored image immediately after shooting.

Figure 4:
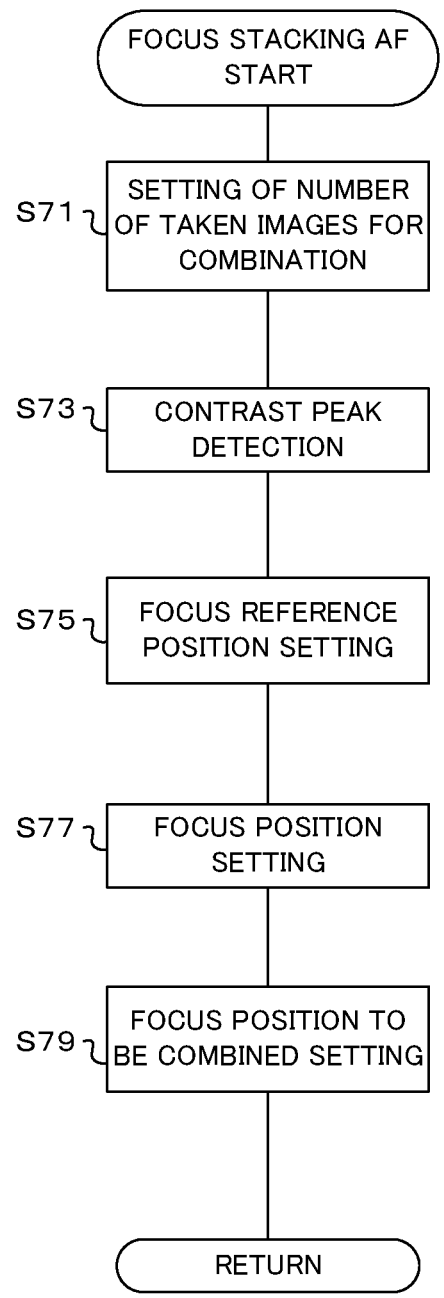
FIG. 4 is a flowchart showing a focus stacking AF operation of the camera of one embodiment of the present invention.

Next, detailed operation of the focus stacking AF in step S36 will be described using the flowchart shown in FIG. 4.

If the flow for focus stacking AF is entered, first the number of taken images for combination is set (S71). Here, the number of images that will be taken for combination of still pictures at the time of shooting in step S43 is determined. The number of images for combination may be determined in advance in accordance with circumstances such as storage capacity of the storage medium 131 etc. or may be set by the photographer.

If setting of the number of images for combination has been carried out step S71, next a peak of a contrast signal is detected (S73). Here, a subject is photographed (image data repeatedly acquired from the image sensor 103) at focus intervals (movement intervals for focus position where shooting is performed while repeatedly moving and stopping the focus lens) suitable for detection of a contrast peak, image data is acquired, and this image data is temporarily stored in the SDRAM 127 in association with the focus position. A contrast signal is then extracted from image data acquired at that time, and the position of this contrast signal is detected. However, a focus interval in this step is set finer than for normal AF contrast peak detection, and a range in which focus is scanned is set wider. Also, detection of a contrast peak is carried out using image data that has been mixed by the pixel mixing circuit 106. Image data while focus scan is in progress is saved to the SDRAM 127.

Setting the focus interval finely and setting the range in which focus scan is performed to be wide in step S73 is for the following reason. With a normal AF operation, only peak position of a contrast signal needs to be detected, and so it is not necessary to make the focus interval so fine, and there is no need to make the scan range wide. However, with this embodiment the intention is to acquire images for focus stacking, and in order to make the depth of field of the image after combination a desired depth of field focus interval and scan width differ from normal AF. Specifically, in order to set focus interval in accordance with depth of field, setting is finer than normal AF peak detection, and in order to make depth of field large scan width is made wider than normal AF.

If contrast peak detection has been carried out in step S73, next a focus reference position is set (S75). Here, a focus position where the contrast signal becomes a peak value is set as the focus reference position. Specifically, an in-focus position is made the focus reference position.

If focus reference position has been set in step S75, next focus position is set (S77). Here, a focus position used with the still picture shooting of step S43 is set. It is preferable to make the focus reference position that was set in step S75 a center, and to arrange the same number of taken images towards the close up end and towards the telephoto end from this center position. Also, interval for focus position is determined by referencing a reference interval table (stored in the flash memory 125) with subject distance, focal length, and aperture value as arguments.

Once focus position setting has been carried out in step S77, next, focus positions to be combined are set (S79). An interval for focus positions to be combined is made an interval derived by multiplying the reference interval by a resolution correction coefficient (stored in the flash memory 125). The resolution correction coefficient is determined taking into consideration the resolution of the images that were taken before combination, resolution of the display panel 135, a combination effect when displayed on the display panel 135, and time required for image processing.

Figure 3:
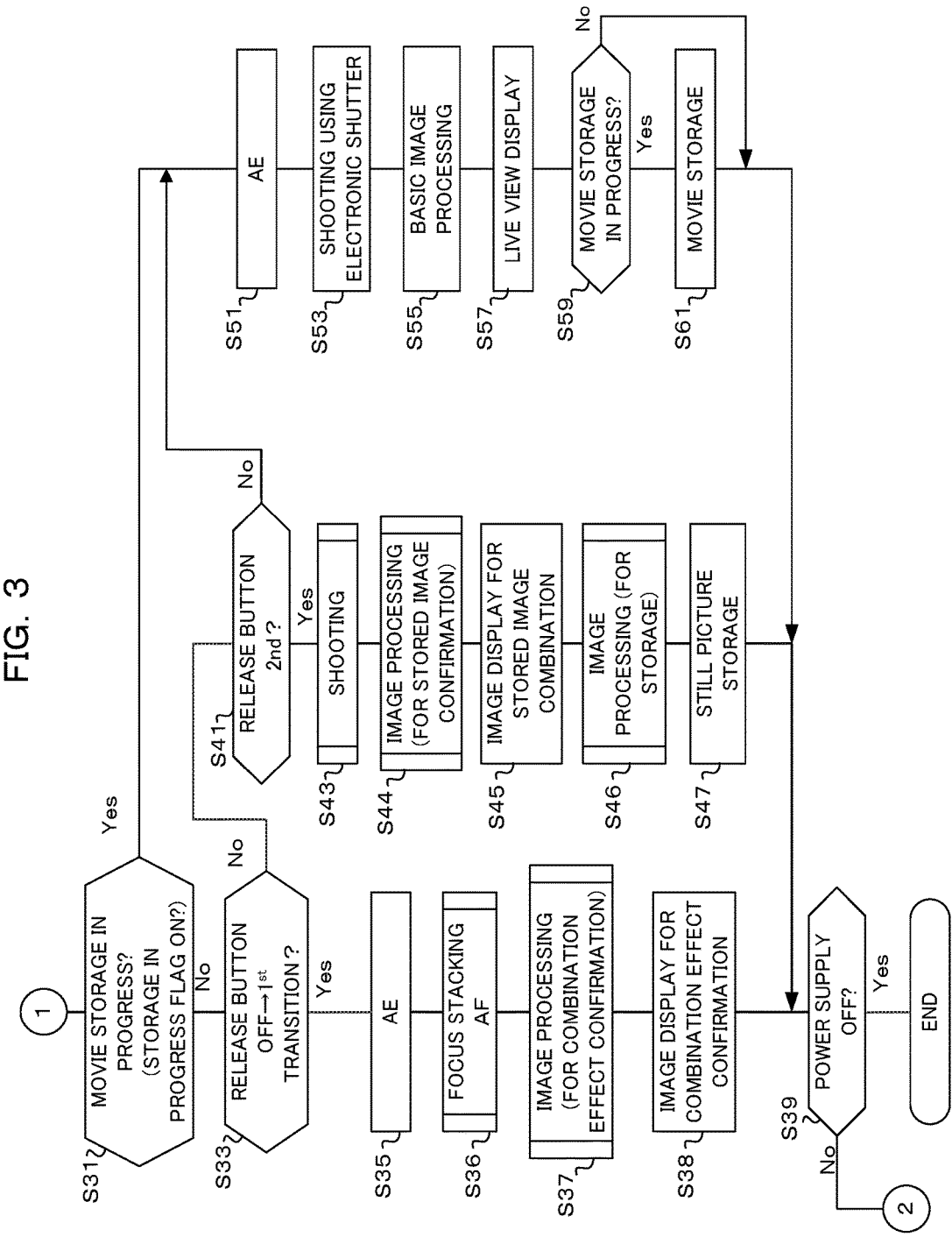
FIG. 3 is a flowchart showing main operation of the camera of one embodiment of the present invention.

As was described previously, there are two types of focus stacking processing for confirmation, namely for combination effect confirmation when the shutter release button has been pressed down half way (S37 in FIG. 3), and for confirmation of stored images when the shutter release button has been pressed down fully (S44 in FIG. 3). The resolution of both images may be the same, but since confirmation of a stored image is for confirmation of an image that is actually stored, the resolution for stored image confirmation is preferably made high-resolution. For this reason, the reference interval table stored in the flash memory 125 and the resolution correction coefficient are provided in two types, namely for combination effect confirmation and for stored image confirmation.

If focus positions to be combined have been set in step S79, the processing flow for focus stacking AF is completed and the originating processing flow is returned to.

Figure 5:
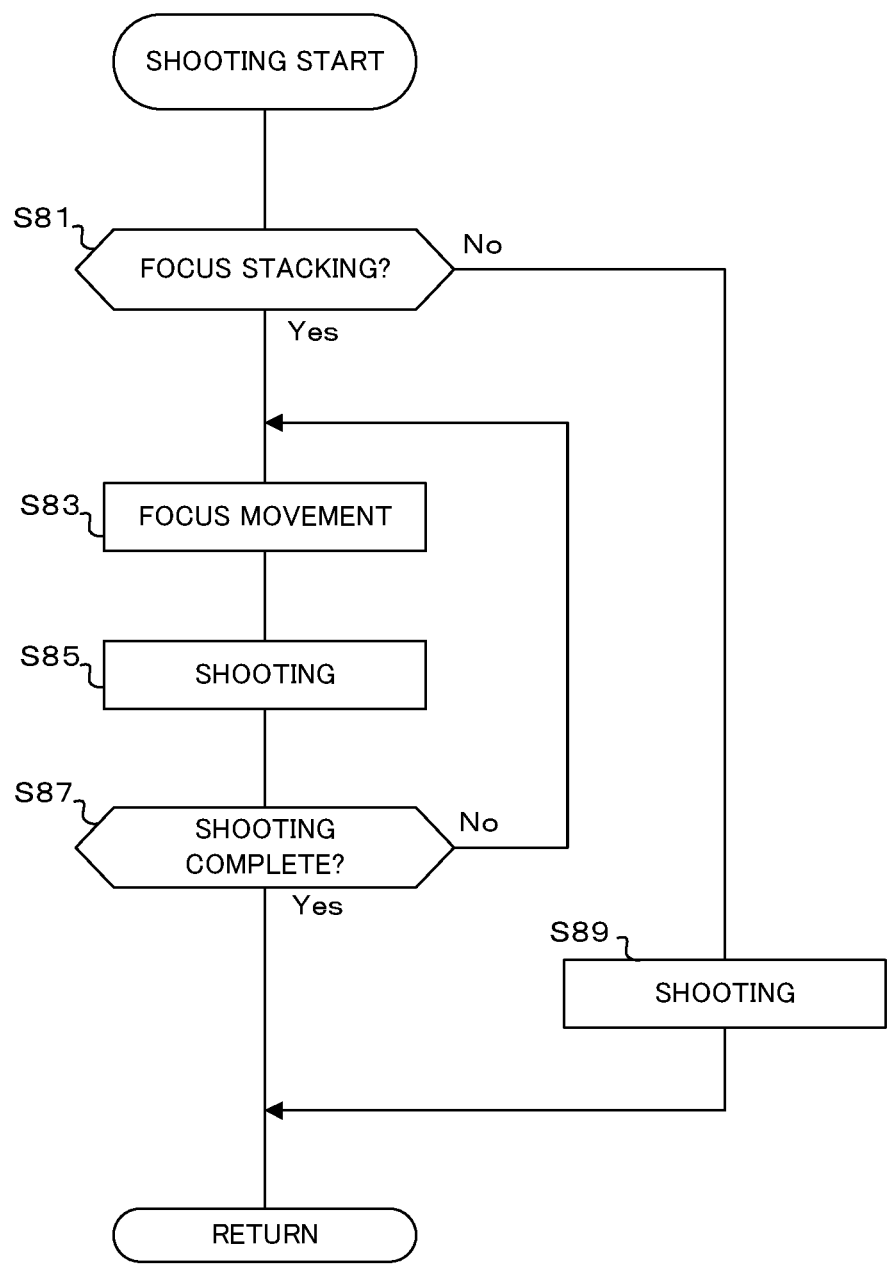
FIG. 5 is a flowchart showing image processing operation of the camera of one embodiment of the present invention.

Next, detailed operation of the shooting in step S43 will be described using the flowchart shown in FIG. 5. If the flow for shooting is entered, it is first determined whether or not focus stacking is set (S81). Focus stacking mode can be set by the user in the camera setting of step S9.

If the result of determination in step S81 is that focus stacking mode has not been set, shooting is carried out (S89). Here, the shutter release button is pressed down halfway, shooting is carried out by the image sensor 103 at the exposure control values and in-focus position that were determined in step S35, and image data is acquired.

On the other hand, if the result of determination in step S81 is that focus stacking mode is set, focus lens movement is carried out (S83). Here, the focus lens is moved to the focus positions that were set in step S75 (FIG. 4), in an order that has been set.

Once focus lens movement has been carried out, next shooting is carried out (S85). If the focus position that was set in step S75 is reached, shooting is carried out at the exposure control values that were calculated in step S35, and image data is acquired from the image sensor 103. With the shooting here, exposure time is controlled by the mechanical shutter 101, but the exposure time may be controlled by the electronic shutter of the image sensor 103. Image data that has been acquired by shooting is temporarily held in the SDRAM 127.

Once shooting has being carried out, it is next determined whether or not shooting is completed (S87). Here, it is determined whether or not shooting has been carried out for the number of focus positions (number of taken images) that was set in step S75. If the result of this determination is that shooting of the set number of images for focus stacking has not been completed, processing returns to step S83, the focus lens is moved to the next focus position, and shooting for focus stacking is carried out.

If the result of determination in step S87 is that shooting of the set number of images for focus stacking has been completed, or if shooting was carried out in step S89, the shooting processing flow is terminated, and the originating processing flow is returned to In this way, in the processing flow for shooting, in the case where focus stacking has been set (S81), shooting is carried out by moving to a focus position that has been set in step S75 (S85). Once shooting has been completed for all of the previously set focus positions (S87), the shooting for focus stacking is completed.

Next, detailed operation of the image processing in steps S37, S44, and S46 (FIG. 4) will be described using the flowchart shown in FIG. 6. If the processing flow for image processing is entered, first, similarly to step S81, it is determined whether or not there is focus stacking (S111). In this step, determination is based on whether or not focus stacking mode has been set in step S9.

If the result of determination in step S111 is that focus stacking mode has not been set, basic image processing is carried out (S127). Here, image data that was acquired in step S89 is read-out, and the basic image processing circuit 109a performs basic image processing such as OB subtraction processing, WB correction, color matrix calculation, gamma conversion, edge enhancement, and noise reduction etc. on this image data.

On the other hand, if the result of determination in step S111 is that focus stacking mode has been set, basic image processing is carried out (S113). Here, the basic image processing circuit 109a performs basic image processing such as OB subtraction processing, WB correction, color matrix calculation, gamma conversion, edge enhancement, and noise reduction etc. on image data that was acquired for focus stacking in step S85. The basic image processing offset in step S113 may be the same as the basic image processing in step S127, but since the basic image processing of step S113 is for focus stacking it may differ from the basic image processing of normal mode in that strong edge enhancement may be applied, for example.

Once the basic image processing has been carried out, it is next determined whether or not the processed image is either for stored image effect confirmation or for combination effect confirmation (S115). Here, in the case of the image processing of step S37 or S44 the determination is Yes, while for the image processing of the stored image in step S46 determination is No.

If the result of determination in step S115 is that it is either for stored image effect confirmation or for combination effect confirmation, resolution conversion is carried out (S117). Here, the resolution conversion circuit 109b carries out a resolution conversion on the image data that was acquired in step S85, using resolution of an image stored in the flash memory 127. In this case, the resolution of the image is converted in line with the resolution of the display panel 135 on which it will be displayed.

Once resolution conversion has been carried out in S117, or if the result of determination in step S115 was No, it is next determined whether or not this is the first image (S119). Here, it is determined whether or not it is the first image among the plurality of images that have been acquired for focus stacking. If it is the first image, then since there is no image to be combined with, processing of step S117 is skipped.

If the result of determination in S119 is not that it is the first image, alignment is carried out (S121). In this step, the image combination circuit 109c carries out alignment to correct coordinate offset of the images for combination that have been taken. As the alignment, for example, a single image is divided into blocks, movement amounts to a coordinate with the lowest correlation value are calculated for each block, and alignment is carried out to match the movement amounts. Besides this, it is also possible to calculate movement amount for the entire image. A method for calculating movement amount of the entire image can shorten computation time, but has reduced precision.

Once alignment has been carried out, next focus stacking is carried out (S123). Here, the image combination circuit 109c carries out image combination in order to obtain an effect of enlarging the depth of field. For example, high-frequency components of each image are extracted for every pixel, pixels where the extracted high-frequency components are higher are adopted, high-frequency components are combined for every pixel, and a focus stacking image is generated.

Once focus stacking has been carried out in step S123, or if the result of determination in step S119 is that it is the first image, it is determined whether or not processing is complete (S125). Here it is determined whether or not processing for the taken images for combination has been completed. Specifically, in the case of image processing for stored image effect confirmation or for combination effect confirmation, it is determined whether or not processing for all image data, corresponding to focus positions to be combined that were set in step S79 (FIG. 4), has been completed. Also, in the case of image processing of an image for storage, determination is based on whether or not processing for all image data, corresponding to focus positions that were set in steps S71 and S77, has been completed. If the result of this determination is that processing has not been completed, the next image for combination is read-out, and processing for step S113 onwards is repeated.

If the result of determination step S121 is that processing has been completed, or if basic image processing is carried out in step S123, the processing flow for image processing is completed, and the originating processing flow is returned to stop In this way, with the image processing flow of this embodiment, in the case of focus stacking, focus stacking is carried out using a plurality of images for combination that were taken in step S85 (refer to FIG. 5) (S123). Also, in the case of focus stacking for stored image effect confirmation or for combined effect confirmation, resolution conversion is carried out (S117). Making the size of the image data small using resolution conversion will facilitate maintaining of display precision and shortening of processing time.

Figure 7:
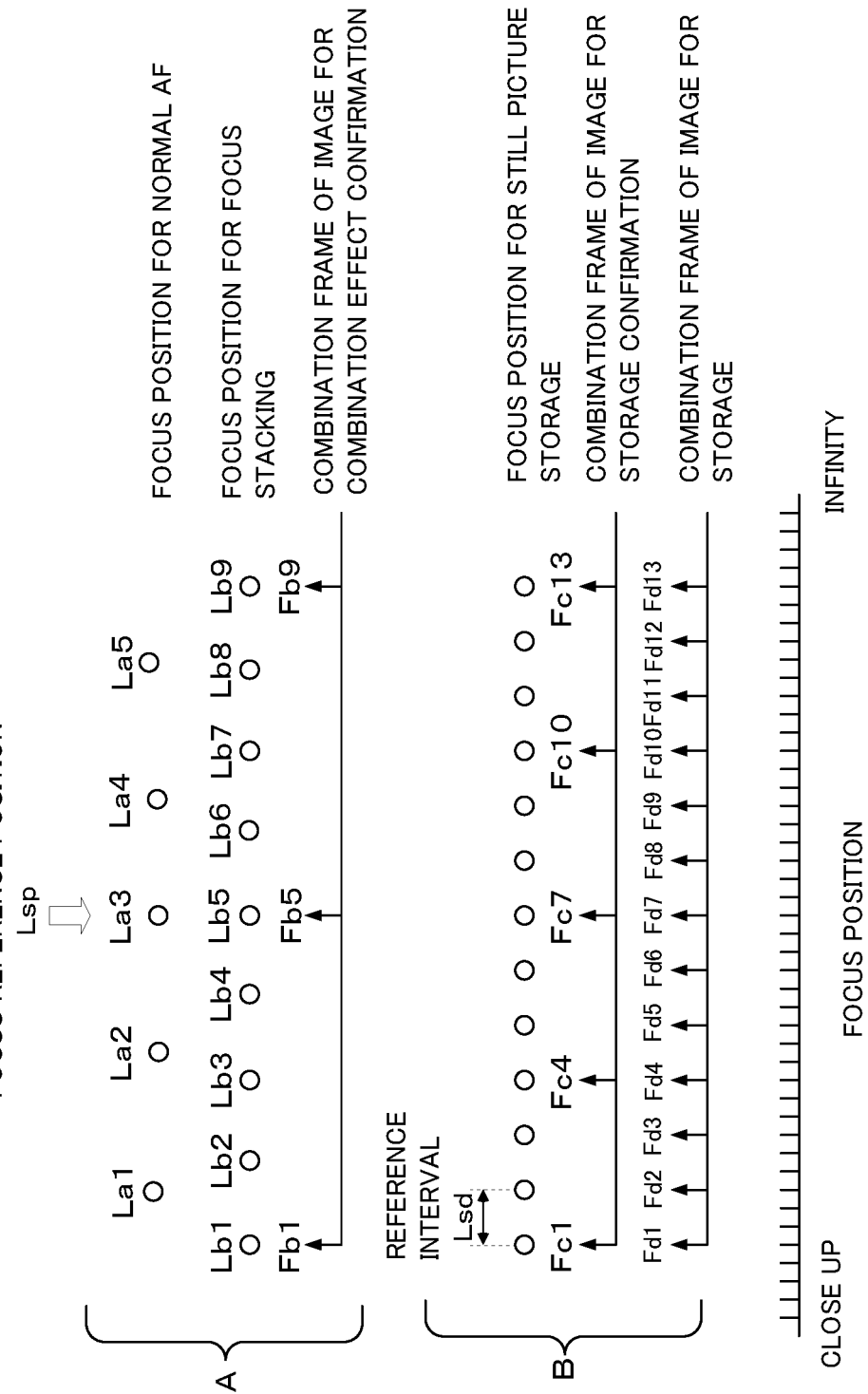
FIG. 7 is a drawing showing the relationship between focus position and combination frame, in the camera of one embodiment of the present invention.

A relationship between focus position and combination frame will be described using FIG. 7. In FIG. 7, the horizontal axis shows focus position. Also, the range shown by reference symbol A shows focus positions and positions of combination frames of images for combined effect confirmation for the focus stacking AF of step S36. The range shown by reference symbol B shows focus position and positions of combination frames at the time of actual shooting in steps S43-S47.

In the case of focus stacking AF, as shown in the range of reference symbol A, the intervals for focus positions Lb1-Lb9 for focus stacking AF are closer together compared to the intervals of focus positions La1-La5 for normal AF. This is in order to correctly set focus position for focus stacking at the time of storage. Also, an image for combined effect confirmation is combined using image data that was acquired at focus positions Fb1, Fb5 and Fb9. Since there are only a few image frames used in focus stacking, it is possible to ensure display precision of the display panel 135 and shorten the processing time for combination.

Also, in the case of actual shooting carried out when the shutter release button is pressed down fully, as shown by the range of reference symbol B, focus positions for still picture storage are set every reference interval Lsd, image data is acquired at focus positions Fd1-Fd13 corresponding to these reference intervals, and a focus stacking image for storage is generated from these image data. Focus stacking image for storage confirmation is generated using image data that has been acquired at focus positions Fc1-Fc13.

In this way, the number of image frames used for combined effect confirmation is lowest, the next lowest is the number of frames used for storage confirmation, and frames used for a storage image are the highest in number. As a result, a focus stacking image for storage takes a longer processing time, but it is possible to generate image data of high precision. On the other hand, the focus stacking images for combination effect confirmation or for storage effect confirmation ensure sufficient precision for display on the display panel 135, and can shorten the processing time. As a result, it is possible to observe the confirmation image in a case where focus stacking has been performed without missing photo opportunities.

Figure 9:
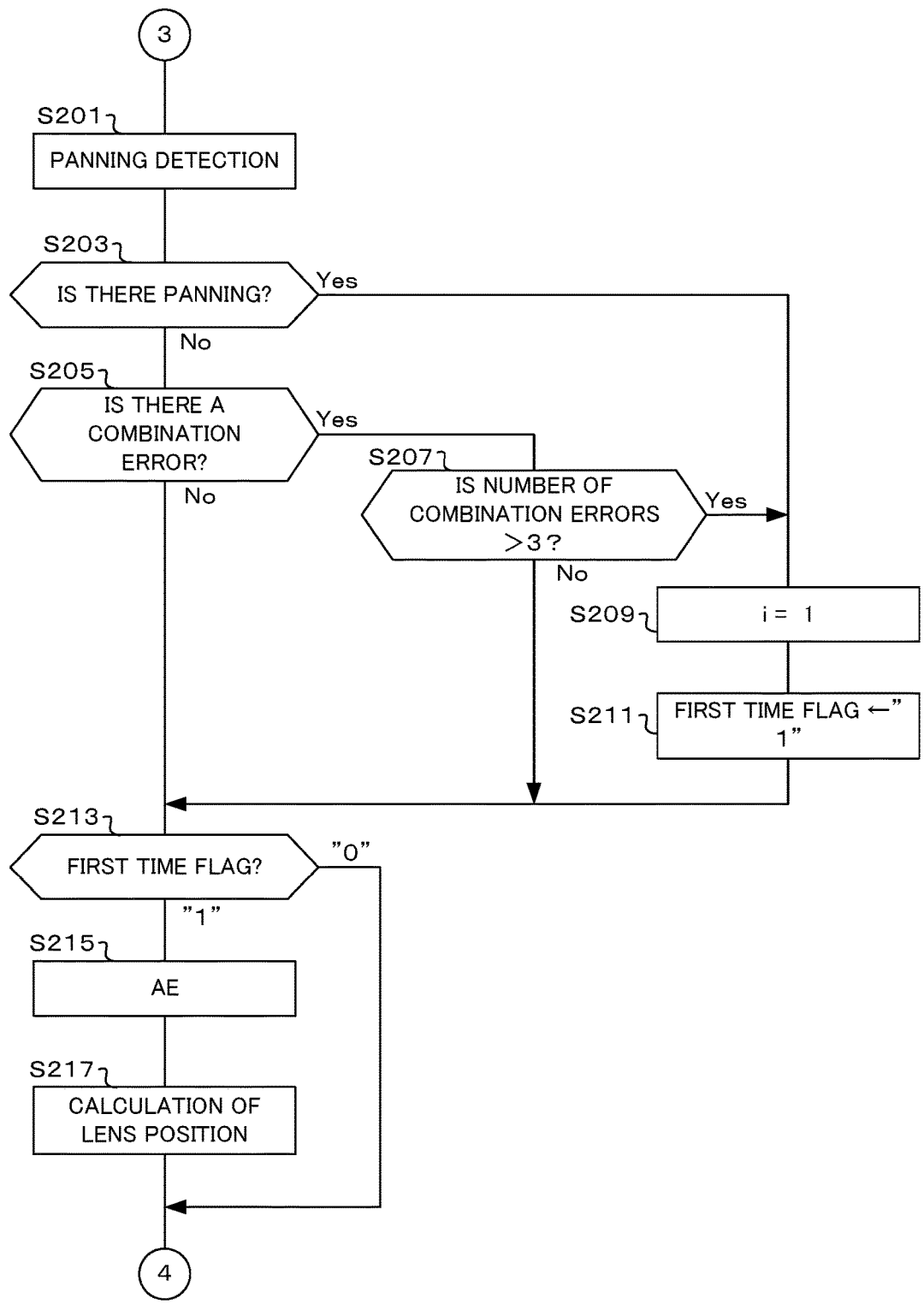
FIG. 9 is a flowchart showing a modified example of main operation of the camera of one embodiment of the present invention.
Figure 10:
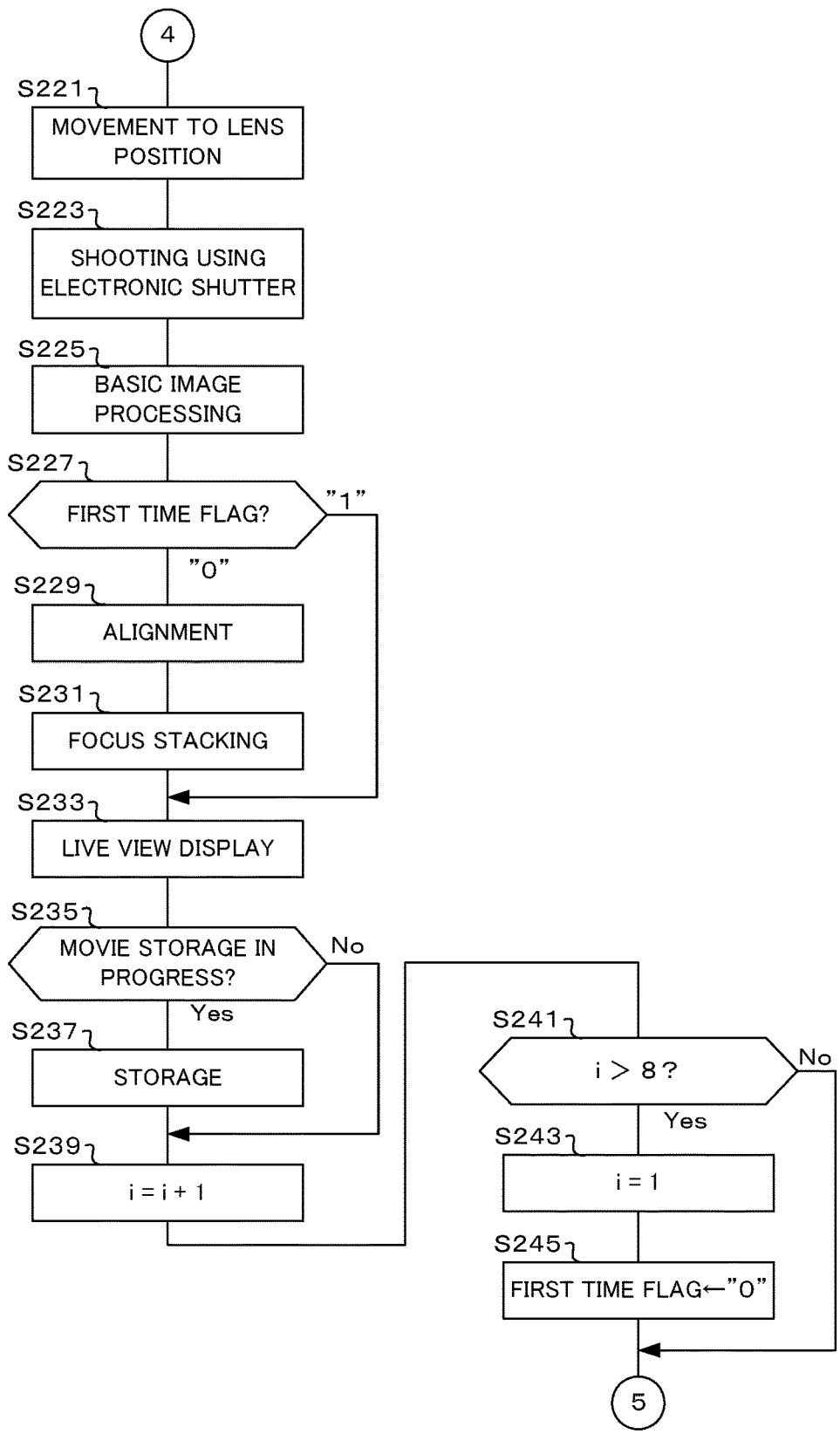
FIG. 10 is a flowchart showing a modified example of main operation of the camera of one embodiment of the present invention.

Next, a modified example of the main operation of one embodiments of the present invention will be described using FIG. 8-FIG. 10. This modified example makes it possible, in the one embodiment of the present invention, to further confirm the effect of focus stacking with live view display. This modified example is the same as the first embodiment of the present invention except for the fact that FIG. 3 is replaced by FIG. 8-FIG. 10, and the description will focus on points of difference With this modified example, in short, images are repeatedly formed while changing focus position of the focus lens, and stored in memory (SDRAM 127). The memory is accessed in a ring buffer type arrangement, after the first access eight images for different focus positions are accumulated, and a combined image resulting from focus stacking is displayed as a live view image. In a case where the subject has changed, an error will arise at the image combination stage, and processing will start again from the preparation of eight images.

If the main operation of this modified example is entered, step S1 shown in FIG. 2 is executed. In this modified example, the initialization in step S1 is initialization of a flag (first time flag='1') and a variable used as a counter (counter i='1') used in this modified example. Also, an error counter is reset to 0. Here, the first flag is a flag for determining the first occurrence of a combined image. The counter i is a counter for counting the number of images in the preparation of 8 combined images.

Once the initialization of step S1 has been performed, steps S3-S19 shown in FIG. 2 are executed. Processing in these steps is the same as the processing in the one embodiment of the present invention.

Figure 8:
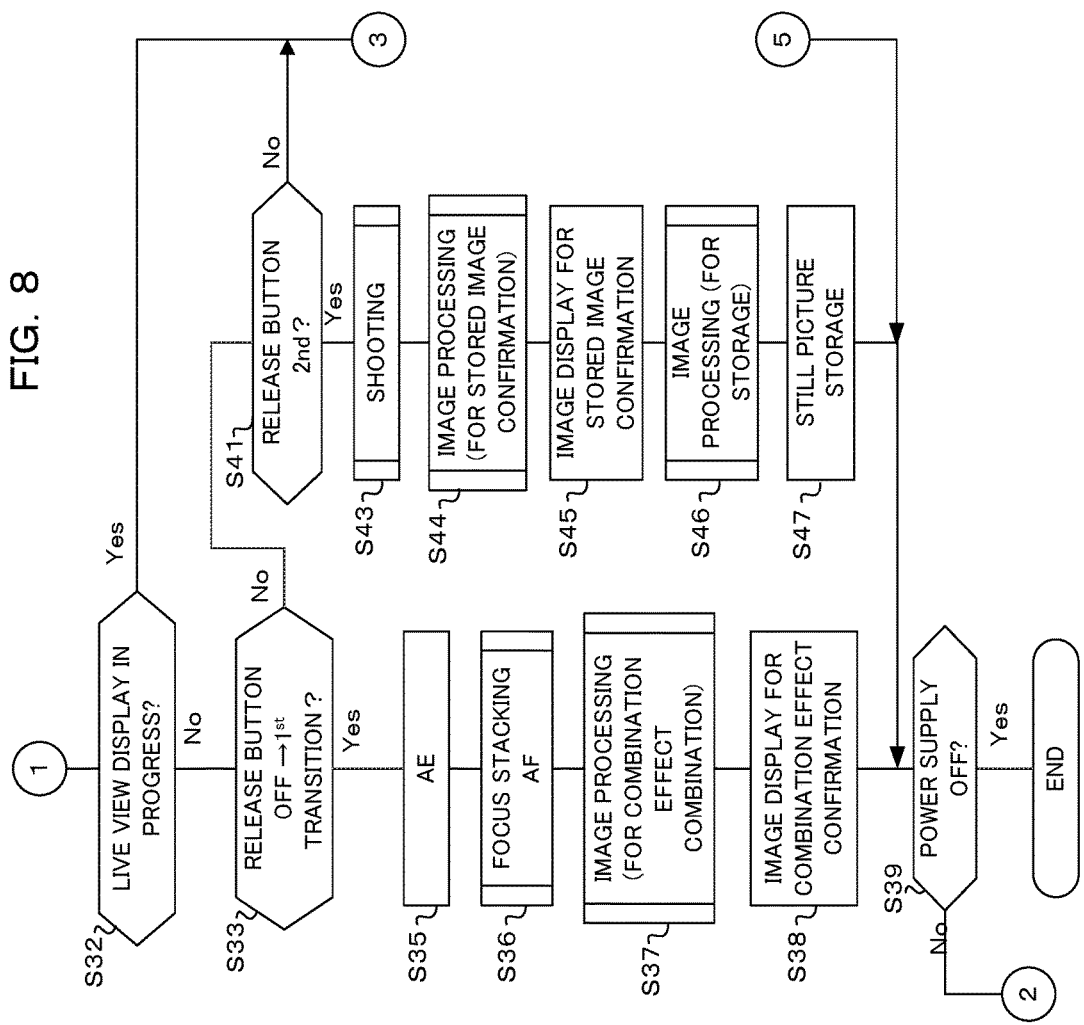
FIG. 8 is a flowchart showing a modified example of main operation of the camera of one embodiment of the present invention.

If the result of determination in step S11 is that the movie button has not been pressed, or if a movie file has been closed in step S17, or if a movie file has been created in step S19, it is determined whether or not live view display is in progress in step S32 of FIG. 8.

If the result of determination in step S32 is that live view display is not in progress, steps S33-S47 are executed. Processing here is the same as the processing in the one embodiment of the present invention.

If the result of determination in step S32 is that live view display is in progress, panning detection is carried out (S201). Here, camera shake is detected by acceleration sensors (not shown) provided within the camera. Detection uses output of acceleration sensors that are fitted for hand shake correction.

Once panning detection has been carried out, it is next determined whether or not there is panning (S203). Here, determination is based on whether or not offset detection amount, that is based on output of the acceleration sensors that was output in step S201, is larger than a given value. In a case where the camera has moved significantly due to the user changing composition or tracking the subject, the amount of detected offset will become larger than the given value. If there is panning, it will not be possible to perform focus stacking, even if there are a plurality of image data, and so in this step it is determined whether or not there is panning.

If the result of determination in step S203 is that there is no panning, it is determined whether or not there is a combination error (S205). In the event that alignment is not possible in step S229, which will be described later, an error signal is output and a combination error counter is incremented. Determination in this step is based on the error signal.

If the result of determination in step S205 is that there is a combination error, it is next determined whether or not the number of combination errors has exceeded 3. 3 is merely an illustrative example, and may be determined in accordance with level required for focus stacking.

If the result of determination in step S207 is that the number of combination errors has exceeding 3, the counter i is reset to 1 (S209), and the first time flag is set to 1 (S211). Since the combination error counter has exceeded 3, it is determined that combination errors are occurring frequently, loading of images for combination is reset, and the first time flag and the counter for counting combined images are reset so as to repeat from the beginning.

Also, if the result of determination in step S203 is that there is planning, in steps S209 and S211 the first time flag and the counter for counting combined images are reset so as to repeat focus stacking.

If the result of determination in step S205 is that there is no combination error, or if the number of combination errors in step S207 is 3 or less, or if the first time flag has been set to 1 in step S211, it is next determined whether the first time flag is "1" or "0" (S213). If image processing for focus stacking is carried out the first time, the first time flag is changed from "0" to "1" in step S245.

If the result of determination in step S213 is that the first time flag is "1", AE processing is carried out (S215). Since it is the initial processing for focus stacking, the AE processing circuit 111 measures subject brightness and carries out exposure computation, such as aperture, shutter speed and ISO sensitivity, in order to enable optimum exposure control.

Next, calculation of lens position is carried out (S217). Here, movement of the main subject in a depth direction is detected, and lens positions for when carrying out shooting eight times are calculated in order to achieve focus from in front of the main subject to behind the main subject (refer, for example, to FIG. 4).

If calculation of lens position has been carried out in step S217, or if the result of determination in step S213 is that the first time flag was "0", there is movement to the calculated lens position (S221). Here, the microcomputer 207 moves the focus lens to the lens position that was calculated in step S217, by means of the driver 205.

If the lens position is moved, next, shooting is carried out using the electronic shutter (S223). Here, the subject is exposed by the electronic shutter within the image sensor 103 for an exposure time that is determined by the electronic shutter speed, and once the exposure time has elapsed image data is read out.

Once shooting using the electronic shutter has been carried out, next basic image processing is carried out (S225). Here, the basic image processing circuit 109a applies basic image processing to image data that was read out in step S223.

Once basic image processing has been carried out, next, similarly to step S213, it is determined whether the first time flag is "1" or "0" (S227).

If the result of determination in step S227 is that the first time flag is "0", positional alignment is carried out (S229), and focus stacking is carried out (S231). If there are 8 or more image data, the first time flag will be "0", and focus stacking is possible. In this step, alignment of associated images is carried out using the 8 image data, and focus stacking processing is carried out. Since the newest 8 image data are temporarily stored in the SDRAM 127, focus stacking is carried out using these 8 image data. Also, as was described previously, in the event that alignment is not possible in step S229, a combination error signal is output. If the first time flag is "1", it means there are not 8 image data, and so focus stacking is not carried out.

If focus stacking has been carried out in step S231, or if the result of determination in step S227 is that the first time flag is "1", next, live view display is carried out (S233). Here, if focus stacking was possible in step S231, an image resulting from focus stacking is subjected to live view display. In this case, it is displayed that the image has been subjected to live-view is a focus stacked image. In the event that focus stacking is not possible, normal live view display is carried out.

Once live view display has been carried out, it is next determined whether or not movie storage is in progress (S235). Here, determination is based on the storage in progress flag.

If the result of determination in step S235 is that movie storage is in progress, storage of movie data is carried out (S237). In the event that focus stacking was carried out in step S231, image data resulting from carrying out that focus stacking is stored.

If storage of movie data has been carried out, or if the result of determination in step S235 is that movie storage is not in progress, the counter i is next incremented by 1 (S239).

It is then determined whether or not a count value i is greater than 8 (S241). If lens position has been moved (S221) and shooting has been carried out (S223), the counter i is incremented by one (S239), and here it is determined whether or not image data exceeding that of 8 images has been stored.

If the result of determination in step S241 is that i>8, the count value i is made 1 (S243), and the first time flag is made "0" (S245).

If the first time flag has been set to "0" in step S245, or if the result of determination in step S241 was not about i>8, processing advances to step S39 (refer to FIG. 8), and the previously described processing is repeated.

In this way, with this modified example, at the point where image data for eight images has been gathered (refer to S241 Yes, S245, S227 "0", S231), a combined image resulting from an initial focus stacking operation is displayed (refer to S233).

Also, in the case of panning, the display of the combined images is not updated (S203 yes, S209, S227 "1"), and if 8 images are acquired, an initial combined image is displayed. By repeatedly carrying out these processes, a combined image resulting from having carried out focus stacking processing is despair as live view.

As has been described above, the imaging device of the one embodiment and the modified example of the present invention comprises an image data acquisition circuit (for example, shooting instruction circuit 121b, image sensor 103, driver 205 etc.) for forming subject images while shifting focus position by a given amount and acquiring a plurality of image data, an image selection circuit for selecting images to be combined based on amounts of shift in focus position when image data was acquired by the image data acquisition circuit, and resolution of image data (for example, combined image selection circuit 121c etc.), and an image combination circuit for generating image data having a large depth of field by combining the plurality of image data that were selected by the image selection circuit (for example, the image combination circuit 109c etc.). In this way, since image data for carrying out image combination is selected based on amount of shift in focus position and resolution of the image data, it is possible to confirm the effect of subject focus stacking in an image before hand, with good precision.

Figure 6:
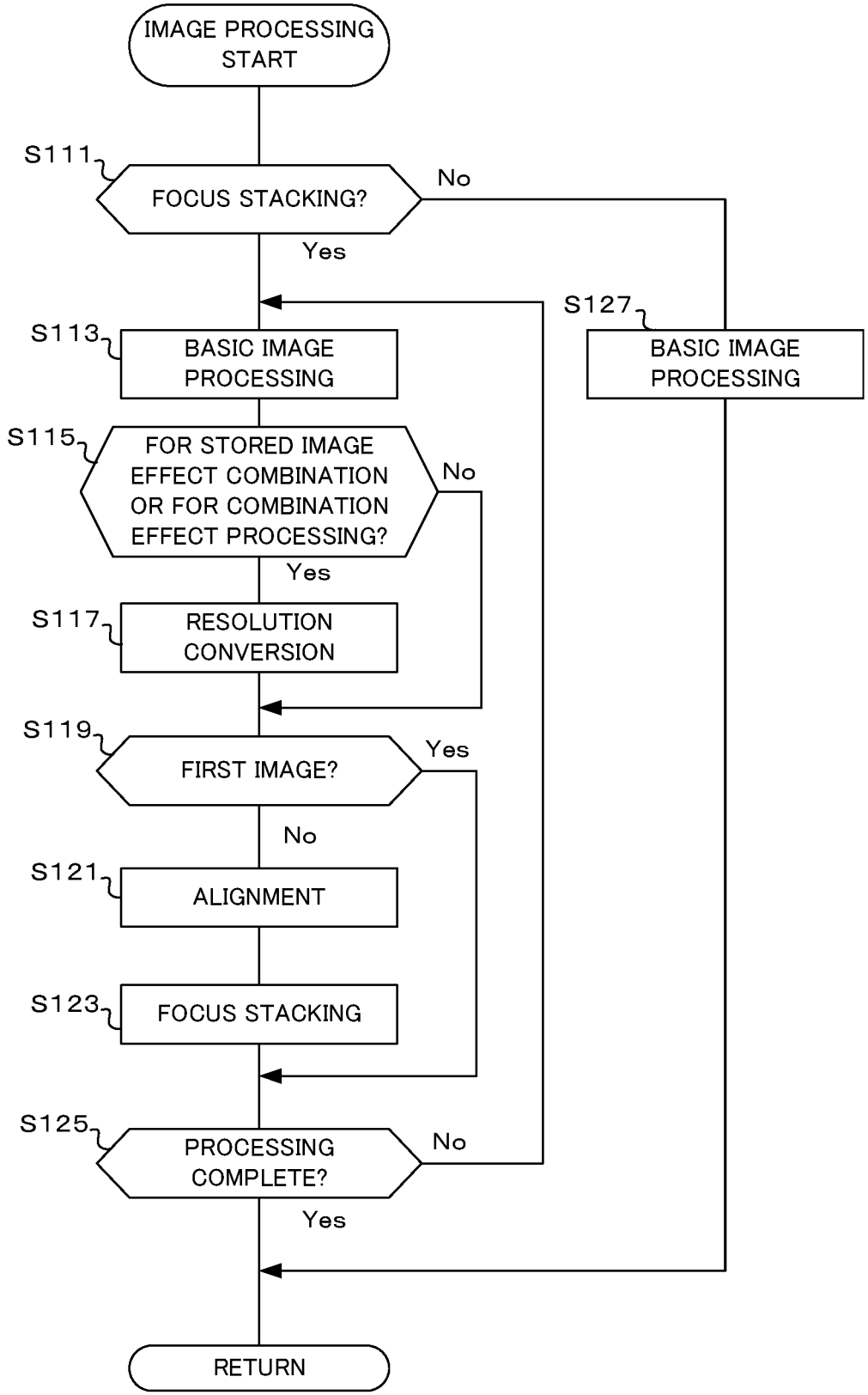
FIG. 6 is a flowchart showing a shooting operation of the camera of one embodiment of the present invention.

Also, a control method of one embodiment of the present invention comprises an image data acquisition step for forming subject images while shifting focus position by a given amount and acquiring a plurality of image data (for example, S73 in FIG. 4, S83 and S85 in FIG. 5), an image selection step for selecting images to be combined based on amounts of shift in focus position when the image data was acquired in the image acquisition step, and resolution of the image data (for example, S115 and S117 in FIG. 6), and an image combination step for generating image data having a large depth of field by combining the plurality of image data that were selected in the image selection step (S123 in FIG. 6).

With the one embodiment on the modified example of the present invention, a focus stacking image for confirmation is generated both when the shutter release button is pressed down halfway and when the shutter release button is pressed down fully, and that image is displayed, but this is not limiting, and the focus stacking image may be generated and displayed either when pressed halfway or when pressed down fully. Also, with the one embodiment of the present invention, the combined image selection circuit 121c, when selecting images to be combined, selects images to be combined based on both focus position when the image data was acquired and resolution of the image data, but this is not limiting and selection may be based on only one or the other of these parameters, and other conditions may also be added.

Also, in the one embodiment and the modified example of the present invention, as the focus stacking image for confirmation only a still image is generated and displayed, but this is not limiting, and a focus stacking image at the time of movie shooting may also be generated and displayed. In the case of a movie, a plurality of frame images acquired while shifting focus position are stored, and frame images used in the combination may be selected based on shift amounts and resolution of the image data.

Further, with the one embodiment and modified example of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC), tablet type computer, game console etc. The present invention may be applied to any device for combining a plurality of images in order to generate an image having a large depth of field. In Also, among the technology that has been described in this specification, with respect to control that has been described mainly using flowcharts, there are many instances where setting is possible using program code, and such program code may be held in a storage medium or storage circuit. The manner of storing the programs in the storage medium or storage circuit may be to store at the time of manufacture, or by using a distributed storage medium, or the program code may be downloaded via the Internet. Also, with regard to the various circuits described in this embodiment, as well as being incorporated onto a single chip, they may also be separately incorporated onto wired substrates.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
   an image data acquisition circuit that determines a plurality of focus positions by repeatedly shifting focus position by a given amount, forms subject images at respective focus positions, and acquires, from the subject images that have been formed, a plurality of image data of a first resolution, or a plurality of image data of a second resolution that is different to the first resolution, and
   an image combination circuit that generates first image data by combining the plurality of image data of the first resolution, or generates second image data by combining the plurality of image data of the second resolution, wherein
   when generating the first image data, the image data acquisition circuit acquires image data at a focus position that has been shifted by a first given amount, a plurality of image data at a plurality of focus positions is acquired by repeating this image data acquisition for a first number of repetitions, and after that the image combination circuit generates the first image data, while when generating the second image data, the image data acquisition circuit acquires image data at a focus position that has been shifted by a second given amount that larger than the first given amount, a plurality of image data are acquired by repeating this image data acquisition for a second number of repetitions, and after that the image combination circuit generates the second image data.

2. The imaging device of claim 1, wherein the first resolution is higher than the second resolution.

3. The imaging device of claim 1, wherein the first image data is for storage and the second image data is for effect confirmation.

4. The imaging device of claim 1, wherein a movement range of focus position resulting from shifting by the first given amount for the first number of repetitions, and a movement range of focus position resulting from shifting by the second given amount for the second number of repetitions, are the same range.

5. The imaging device of claim 1, wherein the first image data is used in order to detect contrast peak of the focus position.

6. The imaging device of claim 1, wherein, a number of the plurality of images of the second resolution that are combined when generating the second image data in the image combination circuit is fewer than the second number of repetitions.

7. The imaging device of claim 6, wherein a number of the plurality of images of the second resolution that are combined is calculated from resolution of the second image data and shift amount of focus position when the second image data was acquired.

8. An imaging method, comprising:
determining a plurality of focus positions by repeatedly shifting focus position by a given amount, forming subject images at respective focus positions, and acquiring, from the subject images that have been formed, a plurality of image data of a first resolution or a plurality of image data of a second resolution that is different to the first resolution, and
generating first image data by combining the plurality of image data of the first resolution, or generating second image data by combining the plurality of image data of the second resolution, wherein
when generating the first image data, image data is acquired at a focus position that has been shifted by a first given amount, a plurality of image data at a plurality of focus positions are acquired by repeating this image data acquisition for a first number of repetitions, and after that the first image data are generated, while when generating the second image data, image data is acquired at a focus position that has been shifted by a second given amount that is more that the first given amount, a plurality of image data are acquired by repeating this image data acquisition for a second number of repetitions, and after that the second image data are generated.

9. A non-transitory computer-readable medium storing a processor executable code, which when executed by at least one processor, performs an imaging method, the imaging method comprising:
determining a plurality of focus positions by repeatedly shifting focus position by a given amount, forming subject images at respective focus positions, and acquiring, from the subject images that have been formed, a plurality of image data of a first resolution or a plurality of image data of a second resolution that is different to the first resolution, and
generating first image data by combining the plurality of image data of the first resolution, or generating second image data by combining the plurality of image data of the second resolution, wherein
when generating the first image data, image data is acquired at a focus position that has been shifted by a first given amount, a plurality of image data at a plurality of focus positions are acquired by repeating this image data acquisition for a first number of repetitions, and after that the first image data are generated, while when generating the second image data, image data is acquired at a focus position that has been shifted by a second given amount that is more that the first given amount, a plurality of image data are acquired by repeating this image data acquisition for a second number of repetitions, and after that the second image data are generated.

* * * * *